(12) United States Patent
Surdam

(10) Patent No.: US 7,165,294 B2
(45) Date of Patent: Jan. 23, 2007

(54) STRAP SACK

(76) Inventor: Christopher Surdam, 229 Wauregan Rd., Danielson, CT (US) 06239

( * ) Notice: Subject to any disclaimer, the term of this patent is extended or adjusted under 35 U.S.C. 154(b) by 61 days.

(21) Appl. No.: 10/762,732

(22) Filed: Jan. 22, 2004

(65) Prior Publication Data

US 2005/0160561 A1    Jul. 28, 2005

(51) Int. Cl.
B25B 25/00    (2006.01)

(52) U.S. Cl. .................................... 24/68 CD; 24/633

(58) Field of Classification Search ...... 24/68 R–70 R, 24/70 T–70 ST, 69 ST–69 TS, 69 AT–69 EF, 24/71 R–71 A, 71 TD–71 CT, 71.1, 306, 24/68 SB–68 TT, 68 A–68 T; 248/499; 254/51, 150, 164, 186, 352, 359; 410/12, 410/97, 100, 103, 104, 106, 110
See application file for complete search history.

(56) References Cited

U.S. PATENT DOCUMENTS

| | | | | |
|---|---|---|---|---|
| 3,697,045 A | | 10/1972 | Farley | 254/51 |
| 3,994,372 A | * | 11/1976 | Geller et al. | 190/107 |
| 4,382,736 A | | 5/1983 | Thomas | 410/104 |
| 4,699,401 A | * | 10/1987 | Saenz | 280/808 |
| 4,878,277 A | * | 11/1989 | Portuese | 24/633 |
| 4,917,505 A | * | 4/1990 | Bullard et al. | 383/4 |
| 4,937,920 A | * | 7/1990 | Tsai | 24/442 |
| 4,961,251 A | * | 10/1990 | Smith | 24/633 |
| 5,002,401 A | * | 3/1991 | Blackman | 383/38 |
| 5,009,346 A | * | 4/1991 | Butler | 224/605 |
| 5,332,093 A | * | 7/1994 | Littlepage | 206/457 |
| 5,351,370 A | * | 10/1994 | Fields et al. | 24/306 |
| 5,377,794 A | * | 1/1995 | Book | 190/1 |
| 5,402,557 A | * | 4/1995 | Dalen | 24/68 CD |
| D382,995 S | * | 9/1997 | Hale | D3/215 |
| 5,947,354 A | * | 9/1999 | Williams | 224/318 |
| 6,138,331 A | * | 10/2000 | Powers | 24/633 |
| 6,273,654 B1 | | 8/2001 | Whitaker | 410/116 |
| 6,296,094 B1 | * | 10/2001 | Knecht | 190/107 |
| 6,315,509 B1 | | 11/2001 | Nadherny et al. | 41/116 |
| 6,318,612 B1 | * | 11/2001 | MacNeil | 24/68 CD |
| 6,604,618 B1 | * | 8/2003 | Godshaw et al. | 190/107 |
| 6,626,621 B1 | | 9/2003 | Hugg | 410/103 |
| 6,651,854 B1 | * | 11/2003 | LaCoste | 224/196 |
| D489,890 S | * | 5/2004 | Gorham, Jr. | D3/218 |
| 6,789,671 B2 | * | 9/2004 | Morrison et al. | 206/388 |

\* cited by examiner

*Primary Examiner*—Robert J. Sandy
*Assistant Examiner*—Ruth C. Rodriguez
(74) *Attorney, Agent, or Firm*—Nields & Lemack

(57) ABSTRACT

Housing for containing excess cargo tie-down material, and for containing the locking mechanism to reduce its exposure to the environmental elements. The housing is in the form of a generally flat portion and a sack made of durable material. The sack is configured to receive excess strap or other tie-down element, and to neatly fold about the locking mechanism to protect the same from severe environmental conditions. The generally flat portion includes opposite free end flaps that when folded towards each other, envelope the locking mechanism and sack.

6 Claims, 4 Drawing Sheets

STRAP SACK

BACKGROUND OF THE INVENTION

Tie-down devices for securing cargo on vehicles such as railway cars, trailers or truck flatbeds or decks are well known. Typically the devices include a winch or a ratchet which receives a tie-down element such as a cable, chain, rope, strap or the like. The tie-down element is secured to one side of the vehicle bed, draped over the cargo, and attached to the other side of the bed. Once the cargo is secured beneath the tie-down element, the winch or ratchet is actuated to tension the tie-down element over the cargo, securing the same in place.

Since the dimensions of various cargoes can vary considerably, the length of the tie-down element necessary to secure the cargo also varies. As the tie-down element is tensioned by the winch or ratchet, excess strap that is not under tension results. This excess must be secured in some fashion to prevent it from freely flapping as the vehicle travels, as this can cause damage to the cargo, the vehicle, the strap or the tie-down element itself.

Moreover, the tensioning mechanism typically includes a locking mechanism that can freeze upon exposure to freezing rain or snow. The tie-down element also can freeze. In addition, the locking mechanism tends to roll on its side or top due to the cargo shifting during transit or during tightening of the tie-down element. Any movement of the locking mechanism can scratch or damage the cargo.

It is therefore an object of the present invention to provide a device for securing excess tie-down members in a convenient and easy fashion.

It is a further object of the present invention to provide a device that protects the cargo from being scratched or damaged by the locking mechanism.

It is a still further object of the present invention to provide a device that protects the locking mechanism and tie-down element from deleterious environmental conditions, thereby preventing the locking mechanism and tie-down element from freezing or other damage that would occur were it exposed to severe environmental conditions such as snow or freezing rain.

SUMMARY OF THE INVENTION

The problems of the prior art have been overcome by the present invention, which provides a versatile housing for containing excess tie-down material, and for containing the locking mechanism to reduce its exposure to the environmental elements. The housing is preferably in the form of a generally flat portion and a sack made of durable material. The sack is configured to receive excess strap or other tie-down element, and to neatly fold about the locking mechanism to protect the same from severe environmental conditions. The generally flat portion includes opposite free end flaps that when folded towards each other, envelope the locking mechanism and sack. The device of the present invention can be retrofitted with existing tie-down straps and locking mechanisms,

DETAILED DESCRIPTION OF THE INVENTION

Figure 1:
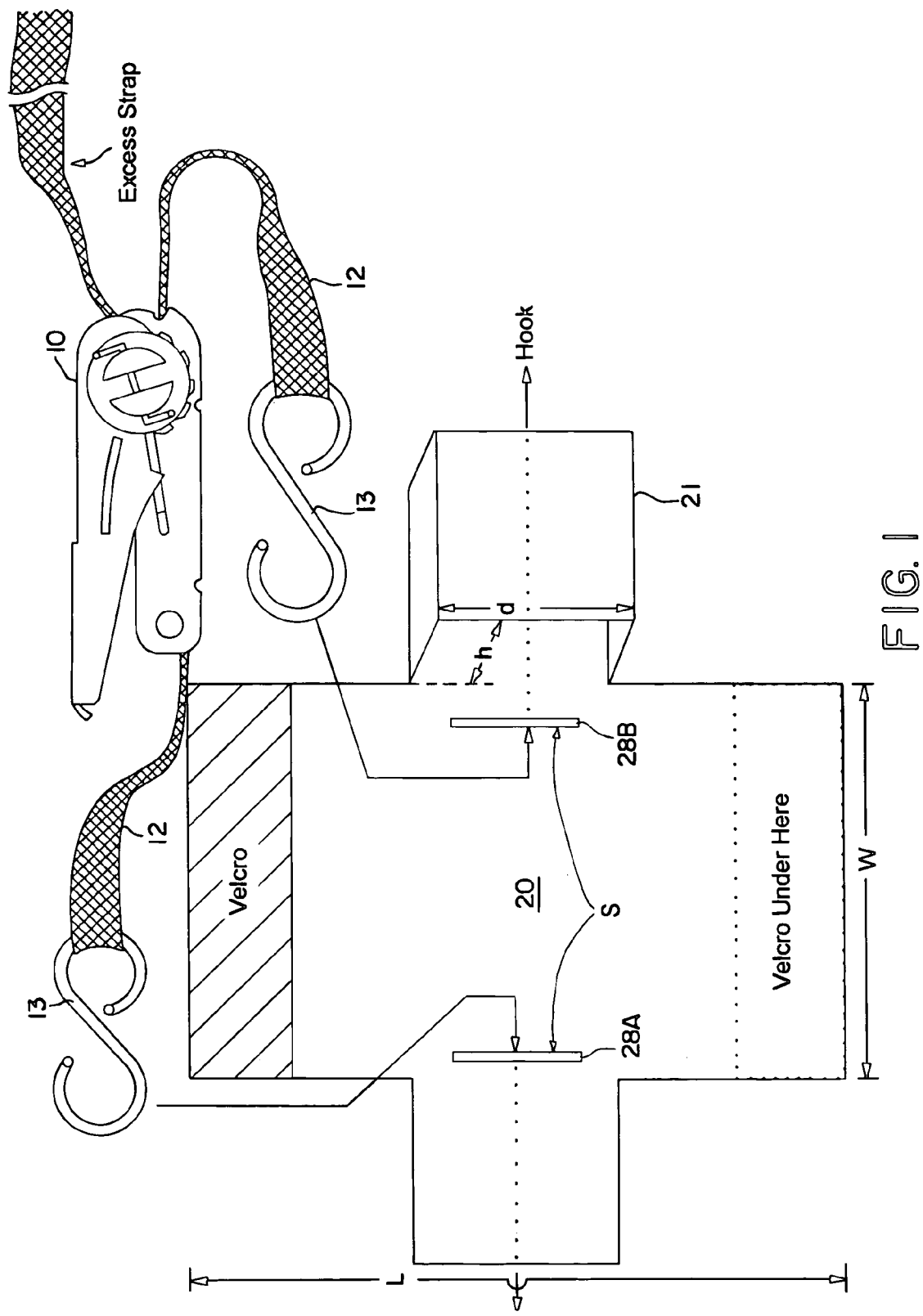
FIG. 1 is an exploded view showing the housing, tie-down element and locking mechanism in accordance with one embodiment of the present invention.

Turning now to FIG. 1, there is shown a tie-down assembly including a conventional ratchet-type locking mechanism 10, strap 12 appropriately threaded in the locking mechanism 10, and hooks 13 attached to the strap at free ends thereof. Those skilled in the art will appreciate that although a strap is shown as the tie-down element, other tie-down elements can be used, including chains, ropes, cables or cords, and that the term "strap" as used herein encompasses such alternatives. Similarly, although hooks 13 are shown as the means for attaching the tie-down element to the vehicle, other attaching devices known to those skilled in the art are also within the scope of the present invention. The present invention is also not limited to any particular locking mechanism design; winches, cams, over-center devices, etc. could be used in addition to the ratchet-type illustrated.

The preferred embodiment of the housing 20 is shown in FIG. 1 in a partially assembled condition. Suitable housing materials are materials that are weather resistant, durable and capable of being folded or otherwise configured into a compact form. Exemplary materials are woven synthetic fiber such as Marine grade polyester fabric, leather, fiberglass cloth, cotton, nylon, vinyl, rubber, foam, woven cloths and non-woven sheet materials. Woven synthetic polyester fabric is particularly preferred in view of its durability, versatility and availability in popular colors.

The housing includes a generally flat portion and an integral sack 21 having a sufficient volume to receive and store any excess strap 12 generated after tensioning of the tie-down device over the cargo being secured. The sack 21 preferably is positioned at or near the centerline of the length "l" of the housing 21, and has one open end to receive the excess strap. Positioning the sack 21 on the centerline allows it to easily fold over and onto the locking mechanism 10. It is positioned with respect to the remainder of the housing 20 (the generally flat portion) so that it can be folded over the remainder of the housing 20 to effectively close the open end and secure the strap inside the sack. The height "h" of the opening of the sack 21 is the same as or less than the width of the remainder of the housing 20 (i.e., width "w" shown in FIG. 1), so that upon folding the sack 21 onto the remainder of the housing 20, the opening of the sack 21 does not extend beyond the housing 20. Similarly, the depth "d" of the sack 21 is less than length "l" of the remainder of the housing 20.

Figure 4:
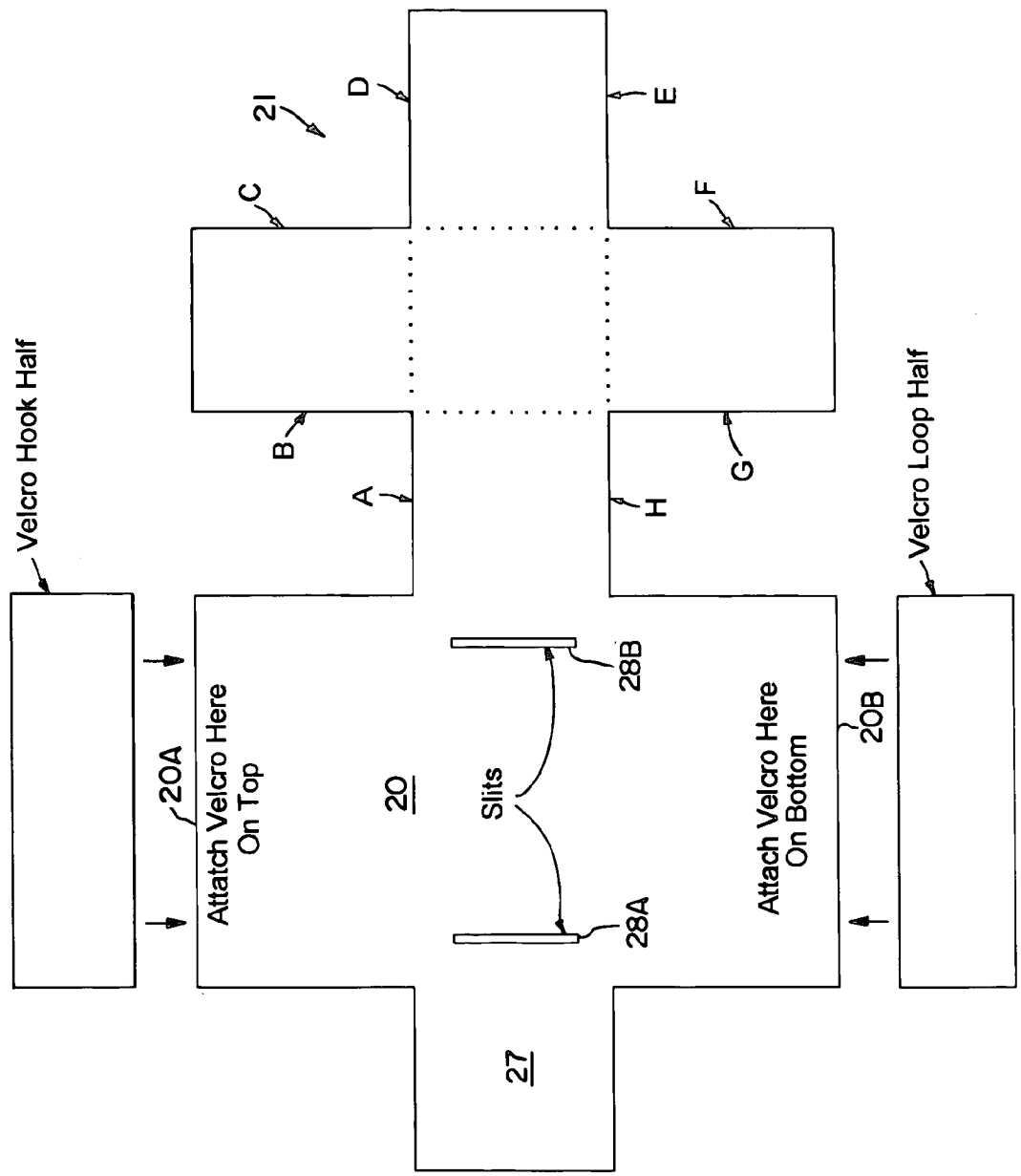
FIG. 4 is a top view of the housing in accordance with one embodiment of the present invention.

FIG. 4 illustrates the housing prior to assembly. The sack 21 is assembled by folding the sides 90° along the dotted lines and then securing the sides, such as by sewing with high strength synthetic thread such as nylon. Thus, edge A is secured to edge B, edge C to edge D, edge E to edge F and edge G to edge H. Alternatively, the sides could be secured by fusion welding, bonding, stapling, interweaving or riveting. The remainder of the housing 20 includes means for securing the opposite longitudinal ends 20A, 20B, together. A preferred means of securing these ends is with strips of hooks and loops such as VELCRO strips. Thus, one of the strips of hooks or loops is secured to the upper surface of the housing 20 at or near the end 20A, and the other of the strips is secured to the opposite under surface at or near the end 20B. Upon folding the ends 20A, 20B toward one another, the hooks and loops will engage and secure the housing 20 together as discussed in greater detail below. Other suitable means to secure the ends of the housing to one another include adhesive, snaps, buttons, zippers, laces, magnets, elastics, springs and hooks, spring-loaded clips and clamps, toggle clamps or latches, suction cups, locks, screws, buckles, draw strings, etc. Any of these also could be used to close the sack 21 if desired.

Figure 2:
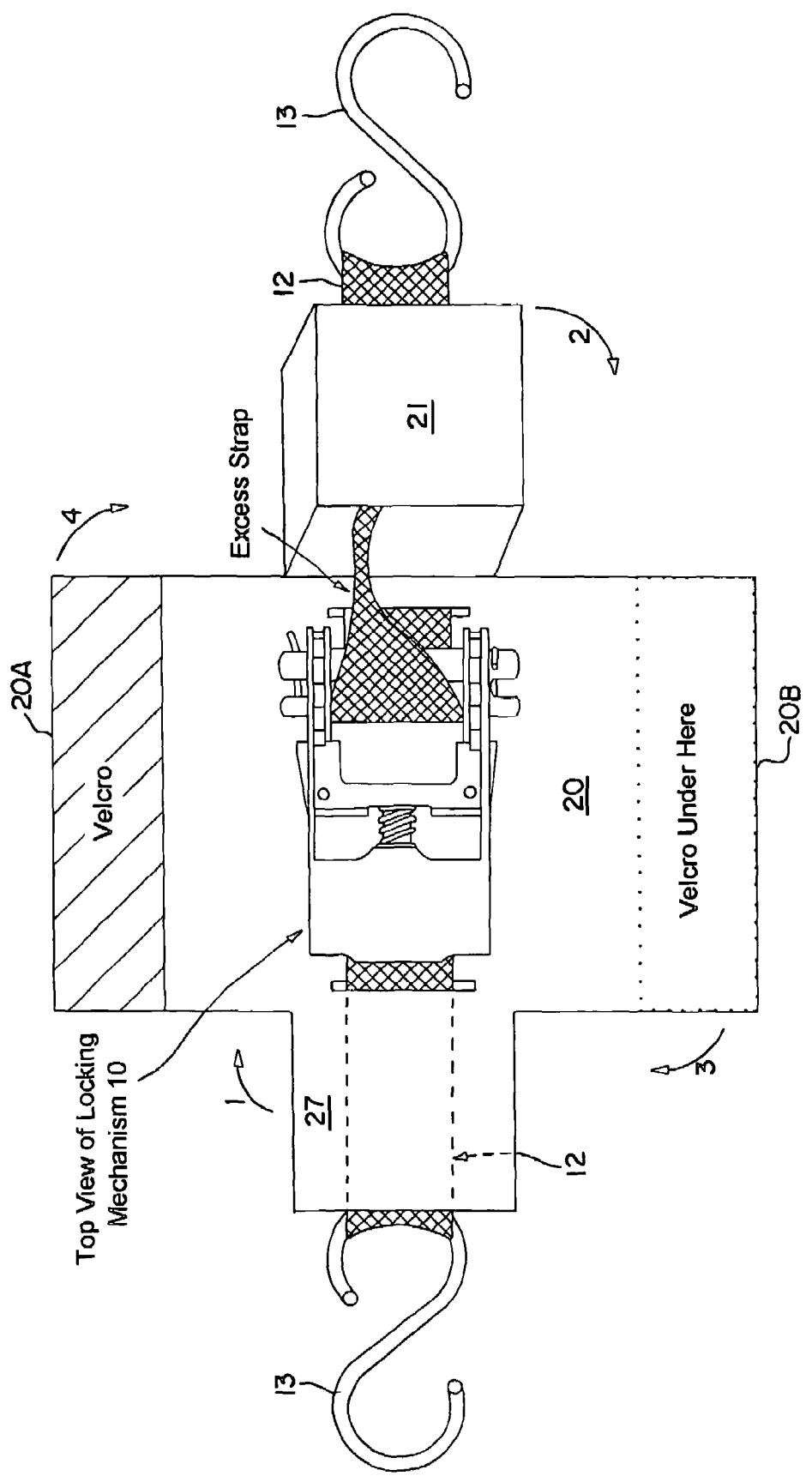
FIG. 2 is a top view of a tie-down system installed in the housing in accordance with one embodiment of the present invention.

The housing 20 includes a pair of slits 28A, 28B penetrating through the housing material. The slits are suitably dimensioned to receive the hooks 13 and strap 12, which are threaded through the slits as best seen in FIG. 2. The slits can be formed in the housing 20 by any suitable means, such as by cutting. Where necessary or desired, the edges of the slits can be reinforced to prevent the housing from ripping further. Preferably the distance "s" between the slits 28A and 28B is sufficient to accommodate the locking mechanism 10 while still allowing the strap 12 to freely move through the slits, again as seen in FIG. 2. Preferably the slits 28A and 28B are aligned directly across from one another (i.e., are parallel and not offset from one another), again to ensure that the strap 12 is allowed to move freely through the slits. Preferably the slits are positioned on the approximate centerline of the length "l" of the housing 21, so that the housing can be opened and closed easily while the locking mechanism is tight against the cargo. Although slits are the preferred form of the apertures through the housing 20, other forms, regular or irregular, can be used without departing from the spirit and scope of the present invention.

The housing 20 also includes a free end flap 27 with no integral means of securement attached to the generally flat portion opposite the sack 21, at or near the centerline of the length "l" of the housing. The width of the flap 27 is preferably equal to or substantially equal to the width of the sack 21, and its length is sufficient so that when it is folded over onto the locking mechanism 10 and the sack is folded onto it, and finally the end flaps 20A, 20B are folded and secured, it will be held securely and not come loose. The flap 27 functions to cover the area of the locking mechanism 10 that is not covered by the folded and secured sack 21, thereby completely shielding the locking mechanism 10 from deleterious environmental conditions and ensuring that the locking mechanism 10 is completely encompasses to further protect the cargo from being scratched or otherwise damaged by it.

Figure 3:
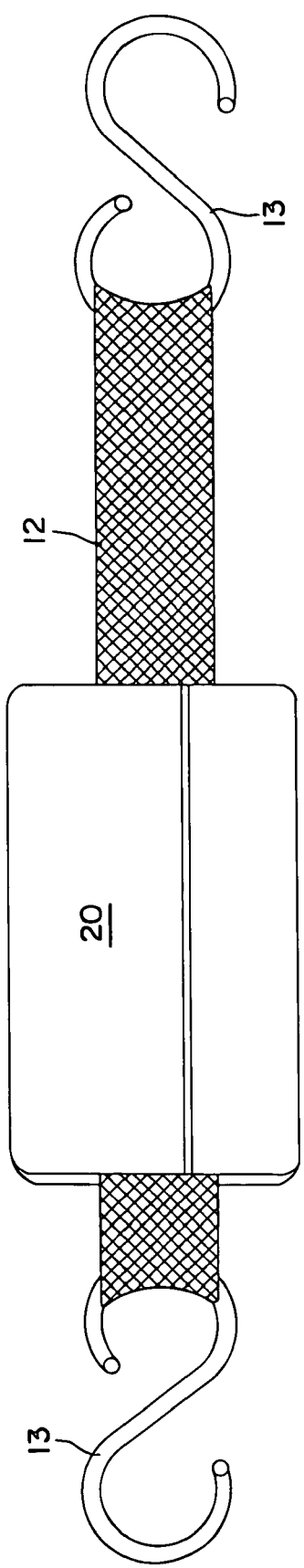
FIG. 3 is a top view of the closed housing showing a tie-down system installed in accordance with one embodiment of the present invention.

The housing 20 is attached to the tie-down device by inserting each of hooked ends 13 through a respective slot, and pulling the strap 13 attached to the hooks through the slits until the locking mechanism 10 is sitting flat against the surface of the housing between the slits 28A and 28B. The hooks 13 are secured to the vehicle, and the cargo is secured by actuating the locking mechanism to tighten the strap 12 over the cargo. Excess strap 12 remaining after the tightening operation is fed into the sack 21. The free end flap is then folded 180° over the locking mechanism as indicated by arrow (1) in FIG. 2. The sack 21 is then folded 180° over the locking mechanism 10, as illustrated by arrow (2) in FIG. 2. One end 20B is then folded 180° over onto the sack 21, as illustrated by arrow (3) in FIG. 2. The opposite end 20A is then folded 180° onto the end 20B as illustrated by arrow (4) in FIG. 2 (those skilled in the art will appreciate that the order of folding flaps 20A and 20B could be reversed if the functional portions of the VELCO are reversed). The hook and loop strips thereby contact each other and engage, securing the housing over the locking mechanism and sack 21, to form an enclosed protective housing as shown in FIG. 3. Those skilled in the art will appreciate that the order of the foregoing assembly can vary, particularly if means other than hooks and loops is used to secure the ends of the housing 20 to one another.

What is claimed is:

1. A cargo tie-down system comprising, in combination, a tie down device comprising a tie-down strap and a locking mechanism to tension said strap, and a housing when in use enclosing said locking mechanism and securing any excess tie-down strap formed after tensioning said strap with said locking mechanism, said housing comprising a sack having a volume sufficient to contain said excess tie-down strap, and a generally flat portion adapted to contain said locking mechanism, said sack being foldable upon said flat portion and securable thereon.

2. The cargo tie-down system of claim 1, wherein said generally flat portion comprises a pair of spaced slits through which said tie-down strap is threaded.

3. The cargo tie-down system of claim 1, wherein said generally flat portion has opposite free ends, and wherein when in use, said opposite free ends are folded onto one another to enclose said sack.

4. The cargo tie-down system of claim 1, wherein said generally flat portion has opposite free ends, and wherein when in use, said opposite free ends are folded onto one another to enclose said locking mechanism.

5. The housing of claim 2, wherein one of said slits is spaced inwardly of said sack.

6. A cargo tie-down system comprising, in combination, a tie down device comprising a tie-down strap and a locking mechanism to tension said strap, and a housing when in use enclosing said locking mechanism and securing any excess tie-down strap formed after tensioning said strap with said locking mechanism, said housing comprising a central portion for receiving said locking mechanism, a first flap extending from said central portion, a sack extending from said central portion opposite said first flap, a second flap extending from said central portion adjacent said first flap, and a third flap extending from said central portion opposite said second flap, said first, second and third flaps and said sack being foldable upon said central portion.

* * * * *